Oct. 29, 1940.                    G. L. MOORE                    2,219,785
                                   LUBRICATOR
                                Filed Aug. 7, 1937
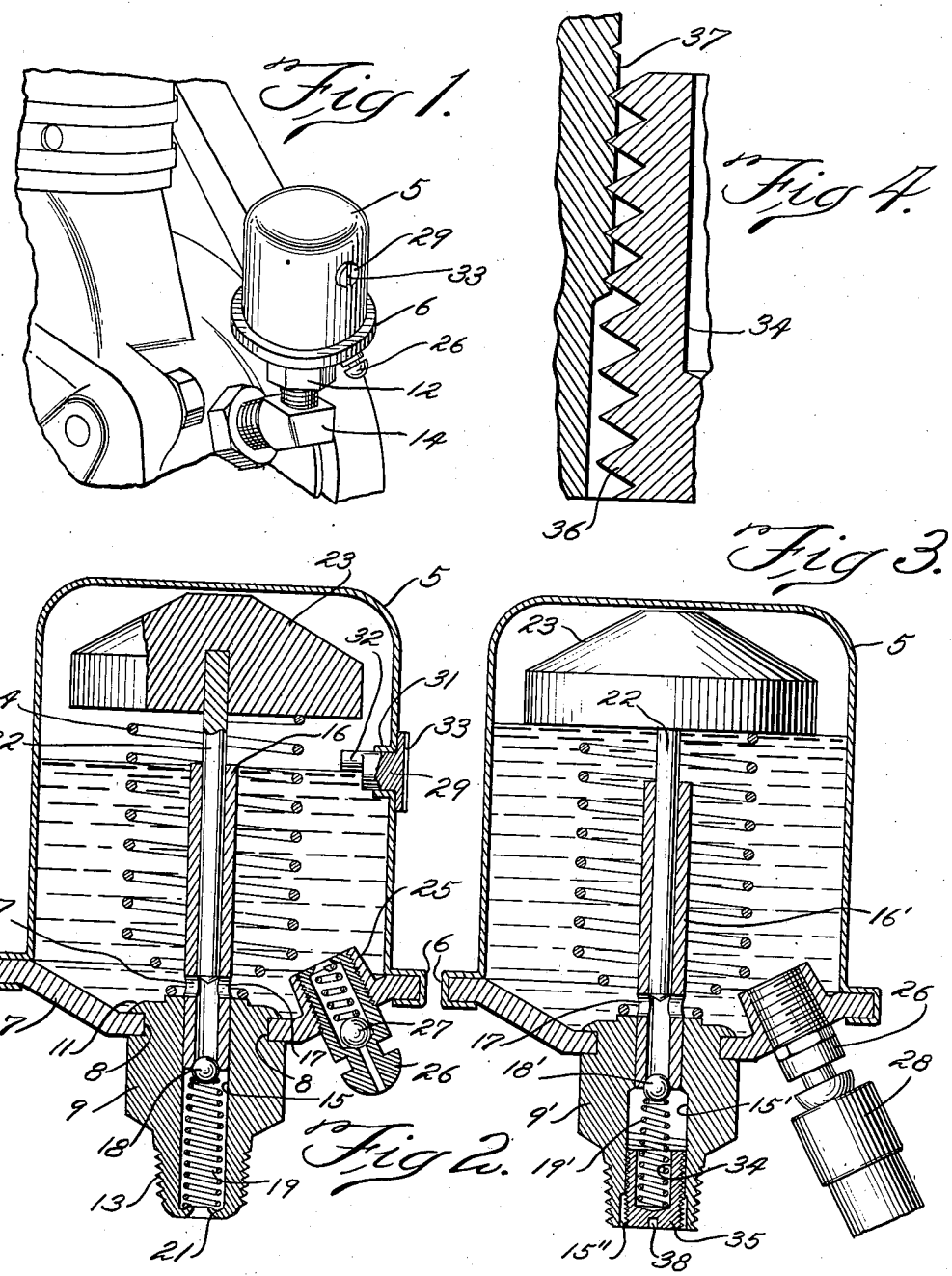

Patented Oct. 29, 1940

2,219,785

UNITED STATES PATENT OFFICE 2,219,785

LUBRICATOR

George L. Moore, Chicago, Ill., assignor, by mesne assignments, to Automatic Lubrication Company, Detroit, Mich., a corporation of Michigan Application August 7, 1937, Serial No. 157,821

9 Claims. (Cl. 184—26)

This invention pertains to automatic lubricators and, more particularly, to reservoir type lubricators adapted to be attached to a bearing or the like and to feed lubricant gradually, but under high pressure if necessary, through the operation of an inertia element in turn operated by vibration or motion induced by external means such as the jarring of a vehicle to which the lubricator is attached. The invention is applicable to lubricators of the character described and claimed in my Patent No. 1,666,502 dated April 17, 1928.

One of the primary objects of the invention is to provide a lubricator of the character described incorporating readily accessible means for regulating or determining characteristics of the flow of lubricant from the reservoir and the inertia operated pump associated therewith to a bearing or the like to which the lubricator may be attached.

Another important object of the invention is to provide a lubricator of the character described so constructed that a volume of air may be trapped and compressed therein above the normal lubricant level when the lubricator has been filled, so as to exert an initial presure upon the lubricant to feed the same into and through a bearing to which the lubricator may be attached, and so that any quantity of lubricant filled into the lubricator above a predetermined level therein, where it would impede or damp the operation of the inertia pump mechanism, will be expelled from the reservoir under very high pressure to flush out the bearing.

A further important object is to provide a lubricator of the character described with means whereby the effective stroke of the pump may be controlled thereby to control the force or pressure upon the lubricant fed to a bearing and the quantity of lubricant fed to the bearing per unit of time or per pump stroke.

Many other objects as well as the advantages of the invention will be or should become apparent and will be understood after reading the following description and claims and after viewing the drawing in which:

Fig. 1 is a perspective view illustrating a lubricator, embodying one form of the invention, applied to the water pump bearing of an internal combustion engine.

Fig. 2 is a vertical section through a lubricator of the character of that illustrated in Fig. 1.

Fig. 3 is a vertical section through a lubricator similar to that of Fig. 1 but employing a modified type of flow control means, and Fig. 4 is an enlarged sectional view of a fragment of the control means of the lubricator of Fig. 3.

The lubricator illustrated in Figs. 1 and 2 comprises a drawn steel cup-like shell 5 the rim portion 6 of which is flared outwardly and rolled tightly about a circular stamped steel base member 7 which is centrally punched or drilled as at 8 for the reception of the reduced end of a fitting member 9. Prior to assembly of the member 7 with the receptacle 5 the reduced portion of fitting member 9 is inserted in the central aperture of member 7 and the end thereof is riveted over as shown at 11 or it may be welded or otherwise secured to member 7 to provide a lubricant tight joint therewith. Sealing compound of an oil proof nature may be used to seal the joints between member 7 and shell 5 and fitting 9.

The shank portions of the fitting member may be provided with facets 12 for engagement by a wrench, and the lower portion may be threaded as at 13 for threaded engagement with an adaptor 14 adapted to be screwed into the bearing to be lubricated or it may be screwed directly into a suitably tapped hole in a bearing.

Fitting 9 is bored centrally as at 15 for the reception of the lower end of a combined guide and cylinder 16. The lower end of guide and cylinder 16 may be a drive fit within the bore 15 or it may be secured therein in any other suitable manner, and at a place immediately above the fitting 9 it is provided with diametrically opposed apertures or ports 17 for the passage of lubricant from the reservoir to the cylinder portion therebelow. The lower end of tubular guide and cylinder member 16 is closed by valve 18 which is urged to its seat by a spring 19 the lower end of which is positioned behind a shoulder 21 provided by rolling or riveting in the lower end of the fitting 9.

The upper portion of the bore of the tubular member 16 provides a guide for a plunger 22 which may be formed of steel rod and which is firmly secured in any suitable manner to a concentric and balanced inertia member or weight 23. A spring 24 the lower end of which rests upon the upper end of fitting 9 and the upper end of which engages the bottom of the weight 23, normally slightly over-balances the weight of the inertia member 23 and the weight of the plunger 22 as well as the friction between the plunger 22 and the walls of the bore in tubular member 16, so as to maintain the inertia member 23 at the top of the reservoir or receptacle 5 under static conditions. If the lubricator be attached to a vehicle and the vehicle goes over a bump, the relative rise of the lubricator relative to the inertia member 23 will force the plunger 22 down into the cylinder closing off the apertures or ports 17 and forcing the lubricant in the cylinder past the check valve 18 and into the bearing. This operation is practically the same as the operation of the lubricator of my patent.

Inasmuch as the receptacle 5 is intended to be substantially hermeticaly sealed except for the outlet ports or apertures 17, air may be trapped within the receptacle to aid in forcing the lubricant into a tight bearing or the like to flush the same and for other purposes and to maintain a pressure greater than atmospheric on the lubricant in the reservoir until the level of lubricant in the reservoir falls to the point where the pressure internally of the reservoir and the external pressure are equal. To this end the member 7 is provided with an internally projecting boss 25 which is internally threaded for the reception of a fitting 26 having a spring pressed valve 27 and to which the ordinary lubricant gun nozzle 28 (see Fig. 3) may be applied to fill the reservoir with lubricant. The spring 19 is preferably of sufficient weight and loading to maintain the ball valve 18 against its seat until the level of the lubricant being injected into the reservoir reaches the level of the top of tubular member 16, at which level the pressure of the air trapped within the reservoir will be sufficient to open the valve 18. While the loading on valve 18 is preferably such as just to balance the valve against the pressure in the reservoir when the level of lubricant is at the level shown in Fig. 2, nevertheless the lubricant fed into the reservoir by a suitable pressure lubricant gun may be fed in faster than the lubricant may pass into a bearing or may pass valve 18 and under these circumstances the level in the reservoir will rise to some extent above the top end of tubular member 16, as, for instance, is indicated in Fig. 3. As the lubricant level drops to the top of tube 16 the pressure in the reservoir will fall and the valve 18 will reseat itself and will only open in response to pressure created by the plunger in response to relative movement of the inertia member 23.

Different characters of bearing and different conditions make it desirable to control the amount of lubricant fed to the bearing in the normal operation of the lubricator. This control may be effected by controlling the effective stroke of the plunger 22 and in the lubricator of Fig. 2 this is accomplished by providing a stop device 29 which projects through a flanged aperture 31 in the side of the receptacle shell 5 on an axis substantially coincident with the top end of tubular member 16 which, of course, limits the downward movement of the inertia member 23. The inner end of the stop device 29 is provided with an eccentric cylindrical boss 32 of a diameter equal to one-half the diameter of the body portion of the stop device projecting into the path of movement of inertia member 23 while the outer portion may be provided with a kerf or slot 33 for the reception of a screw driver or the like whereby it may be rotated. The stop device 29 may be given a tight friction fit in the flanged aperture 31 or it may be held therein for rotation in any other suitable manner. It will be apparent that the eccentric boss 32 provides for infinite adjustment of the stroke of plunger 22 inasmuch as the amount of movement of the inertia member 23 is determined by the position of the surface of the boss 32 with which the inertia member contacts.

The lubricator of Fig. 3 differs in construction and operation from the lubricator of Figs. 1 and 2 only in the omission of the regulating or controlling device 29 and in the substitution of a control or regulating device in the fitting by which the lubricator is to be attached to a bearing or the like. In this case the fitting 9' is provided with a bore or chamber 15' of larger diameter than the bore 15 and the lower end of this bore is enlarged as shown at 15''. A ball valve 18' is held against its seat at the lower end of tubular member 16' by a spring 19' which at its lower end is seated in a recess 34 in a screw plug 35 threadedly engaged by thread 36 with a truncated or mutilated thread 37 tapped into the bore 15' and for substantial portion of the length thereof. A kerf or slot 38 in the screw plug 35 permits adjustment of the plug longitudinally of the bore 15' thereby to increase or decrease the tension on the spring 19' and to increase or decrease the length of the helical passage between the thread 36 and the mutilated thread 37.

This construction and arrangement (Figs. 3 and 4) provides a control, first, of the outlet orifice of the cylinder portion of the tubular member 16', determining the pressure under which the check valve 18' will open and, second, of the resistance to flow of oil or other lubricant between the thread 36 and the mutilated thread 37 which forms a tortuous channel the length of which may be increased or decreased merely by adjusting the plug 35 into or out of the bore or chamber 15'. The enlarged bore 15'' is unthreaded and, of course, is of sufficient area to afford substantially no resistance to flow of the lubricant. The resistance to the flow of lubricant through passage between thread 36 and mutilated thread 37 depends, of course, on the length of the passage as well as on its cross sectional area and the longer the passage for a given cross-section the more slowly the oil will flow from the reservoir under the same conditions of temperature and pressure. The results obtained could be duplicated without providing the counter bore or the enlarged bore 15'' but the provision of the counter bore 15'' makes it unnecessary for the plug 35 to be screwed outwardly so far as to project beyond the lower end of the fitting 9'.

While the invention has been illustrated and described in two embodiments either of which may be preferable under differing conditions of use, it is apparent that other modifications and variations may be utilized and that various changes may be made all without departing from the spirit of the invention and the scope of the appended claims.

I claim:

1. In combination, a receptacle providing a lubricant reservoir and having an air tight dome portion and an outlet passage for lubricant, means connected to the receptacle and containing a chamber of substantial size into which said passage leads, there being a restricted outlet from said chamber through which lubricant can escape only slowly, means to vary the resistance to flow of lubricant through said outlet, an upwardly-seating check valve between said chamber and said passage, and means in the receptacle positively to force successive small quantities of lubricant from said passage into said chamber when the receptacle is subjected to vibration such as road shocks upon a moving motor vehicle.

2. In combination, a receptacle providing a lubricant reservoir and an air compression chamber and having a discharge passage for lubricant, means connected to said receptacle and containing a chamber of substantial size for reception of lubricant from said reservoir and into which said passage leads, there being a delivery outlet from the second said chamber, means to vary the rate at which lubricant can flow through said outlet at any given pressure, a check valve between said passage and the second said chamber to prevent back flow from the chamber into said passage, and means to cause lubricant to be forced from time to time into the second said chamber through said passage.

3. In a lubricator, a receptacle providing a substantially sealed lubricant reservoir, a vertically disposed cylinder in said reservoir, a vertically reciprocating plunger in said cylinder, said cylinder having an outlet and an inlet at its lower end and terminating at its upper end short of the top of the receptacle, an inertia operable weight secured to the upper end of said plunger and exposed to the lubricant in the reservoir, means normally tending to urge said weight and plunger toward the top of said receptacle, and adjustable means accessible from the exterior of the reservoir for varying the effective stroke of said plunger relative to a predetermined inertia effect on said weight and plunger.

4. In a lubricator, a receptacle providing a lubricant reservoir of substantial capacity and an air compression chamber, an inertia operable weighted plunger pump in said receptacle, said pump having an inlet connected with said reservoir, means providing an outlet passageway from said pump, a valve normally closing said passageway and substantially in balance against a predetermined head of lubricant in said reservoir, and means for varying the pressure necessary to open said valve.

5. In a lubricator, a receptacle providing a lubricant reservoir of substantial capacity and sealed against the escape of gas over the top of lubricant contained therein, an inertia operable pump in said receptacle, said pump including a weight member operable in a space in open communication with the lubricant space and above the normal lubricant level in the reservoir, said reservoir and pump having a common outlet passageway, means for filling said reservoir under pressure and to a level above the normal level therein, and a valve normally closing said passageway substantially in balance against a head of lubricant in said reservoir substantially equal to the normal lubricant level therein.

6. In a lubricator, a receptacle providing a lubricant reservoir of substantial capacity and an air dome over the top of the lubricant, said receptacle being sealed against the escape of air from said dome, an inertia operable plunger pump in said receptacle, said reservoir and pump having a common outlet passageway, means including an inwardly opening valve providing an inlet for filling said reservoir, an outwardly opening spring pressed valve in said outlet passageway, the tension on said spring being substantially equal to the head of lubricant in said reservoir at a normal level therein under static conditions, and means for varying the effective stroke of the plunger of said pump.

7. In a lubricator, a receptacle providing a lubricant reservoir, an inertia operable pump including a weight, a cylinder and a plunger operable in the cylinder, said cylinder communicating with said reservoir and having an outlet, and means projecting externally of said reservoir and engageable with said weight for varying the extent of movement of said pump plunger.

8. In a lubricator, a receptacle providing a lubricant reservoir having a bottom outlet, said receptacle normally being sealed to provide an air chamber above the level of lubricant therein, an inertia operable pump including a weight and a plunger wholly disposed and sealed within said receptacle, said weight being exposed in said reservoir, and means accessible from the exterior of said receptacle for varying the effective stroke of said pump plunger.

9. In a lubricator, a receptacle comprising a one piece shell of cup shape, a bottom member sealed to said shell, an inertia operated pump including a cylinder, and a substantially vertically reciprocable plunger operable in said cylinder, said cylinder being carried by said bottom member and disposed within said shell, and means projecting from the exterior to the interior of said shell through a lateral wall thereof for determining the length of the stroke of said plunger with respect to said cylinder.

GEORGE L. MOORE.